INVENTOR
Ewald Pekrul

BY Scrivener, Parker, Scrivener & Clarke
ATTORNEYS

United States Patent Office 3,302,982
Patented Feb. 7, 1967

3,302,982
LOAD-DEPENDENT EMPTY-LOAD VALVE
Ewald Pekrul, Hannover, Germany, assignor to Westinghouse Bremsen- und Apparatebau G.m.b.H., Hannover, Germany
Filed Mar. 18, 1966, Ser. No. 535,481
Claims priority, application Germany, Apr. 30, 1965,
W 34,864
3 Claims. (Cl. 303—60)

This invention relates to a novel regulator for braking pressure depending on the load, especially for motor vehicles, which regulator controls the pressure of the brake cylinder via a differential piston which changeable ratio of its effective surfaces as well as by means of a double seat valve in dependence on the flexure of the springs of the vehicle, whereby a constant effective surface of the differential piston will be acted upon by the pressure of the brake valve and its changeable effective surface will be acted upon by the pressure of the brake cylinder in the opposite direction. Such regulators of the braking power are connected in the compressed air line between the brake valve and the brake cylinders. They are particularly used for the regulation depending on the load, of the pressure of the brake cylinder of the rear wheels of vehicles which have a large ratio between no load and full load. In the case of every condition of load, the pressure of the brake valve will then be at the same ratio in relation to the pressure of the brake cylinder as the full load is to the partial load at any given time.

In the case of a regulator of braking power of the general type described above, a differential piston, having on one side a constant effective surface and on the other side a changeable effective surface has been connected with a diaphragm which fits in one extreme position against radial ribs connected fixedly with the housing, and in the other extreme position will be supported by radial ribs connected with the piston, and which in the intermediate position will be supported by radial ribs of both kinds. In such a construction, the fixed ribs mesh with the intervals between the movable ribs so that through the conicity, a change of the effective surface of the diaphragm will be achieved which is proportional to the path of the piston. Thus, the pressure of the brake cylinder will be regulated proportionally to the path of the differential piston. A valve regulator of the above type is shown in my Patent No. 3,188,149 dated June 8, 1965.

Figure 2:
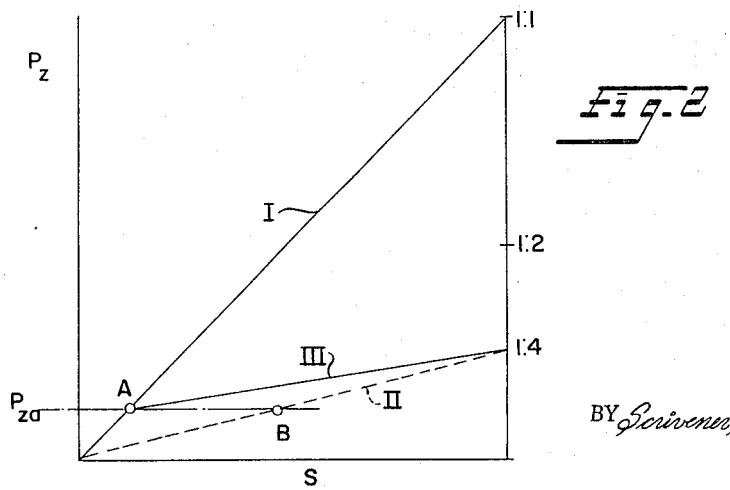

The above type of regulation has some disadvantages which have been illustrated in the characteristic curves shown in FIG. 2 of the drawing. On the assumption that in the case of a truck, the brake pressure of the front wheels is nonregulated and that of the rear wheels however, is regulated depending on the load, the brake pressure of the front wheels will always be equal to the pressure of the brake valve, and in the diagram of FIG. 2 it follows the characteristic line I. In the case of a fully loaded vehicle, the brake pressure regulator will regulate the brake pressure of the rear wheels in a ratio of 1:1, i.e., it also follows the characteristic line I. If the ratio of the no load is known, as for example 1:4, then the regulator will regulate the brake cylinder pressure $P_z$ of the rear wheels to one-quarter of the brake valve pressure in the case of no-load, one-half in the case of one-half load, etc. The dependence is given through the path S of the differential piston or through the corresponding ratio of its effective surface. The normal characteristic line in the case of an empty load follows the characteristic line II of FIG. 2. If we now assume an applied brake pressure $P_{za}$, then this will be achieved for the front wheel brakes at the point A. For the rear wheels, however, pressure $P_{za}$ will be achieved only considerably later, namely at point B. The subsequent actual braking effects differ correspondingly according to time and force, and this may be a disadvantage under certain conditions.

The improvement of the present invention is to provide a novel brake force regulator which is so constructed that its regulating effect will only start with point A, so that the applied brake pressure will be achieved simultaneously in the brake cylinders of the front and rear brakes.

The above improvement is secured by connecting the brake force regulator with a piston-controlled shut off valve having one piston surface acted upon by the brake valve pressure and the opposite surface acted upon by a prestressed spring and by the atmosphere, and by having its control pistons provided with a valve disc which, at a brake valve pressure which is predetermined through the spring, will close off the latter from any connection with the second piston chamber for the piston with the variable effective surface. Advantageous developments further provide that a sealing piston be provided with a control piston, the continuation of said sealing piston having a smaller diameter forming the valve disc, and the sealing piston being guided in a cylinder formed by the upper part of the housing, whereby the base of the cylinder serves as a valve seat. Also, the sealing cylinder is drilled in a longitudinal direction and its continuation in a transverse direction in such a manner that the brake valve air will be present continuously at the shut off valve.

Figure 1:
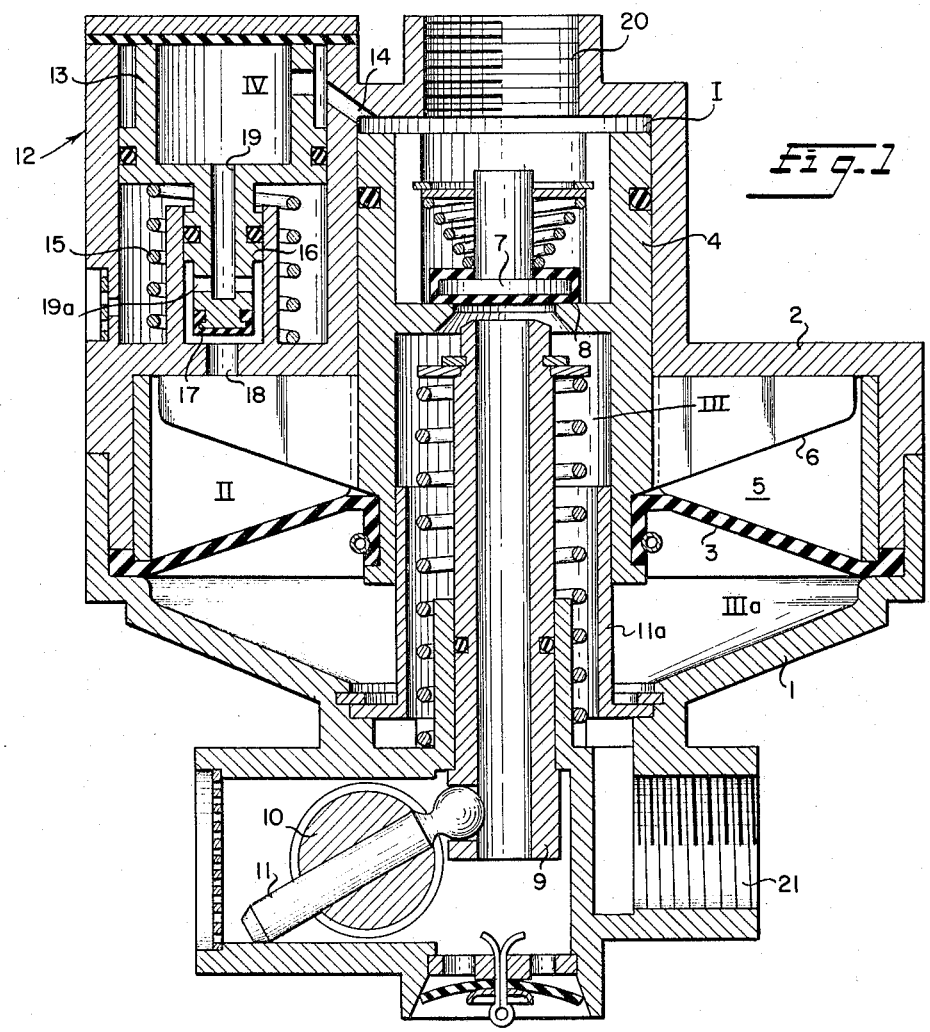

A brake pressure regulator dependent on the load and equipped with the present invention is shown in its center longitudinal section in FIG. 1. FIG. 2 shows the characteristic operating curves of this device.

The main part of the brake pressure regulator consists of a lower housing part 1 and an upper housing part 2, between which the outer edge of a diaphragm 3 is clamped. The inner edge of the diaphragm is suitably attached to a piston 4 having a constant effective surface, whose cylinder is formed by the upper part 2 of the housing. The piston 4 and the diaphragm 3 together form a differential pressure responsive member or piston with a constant effective surface in the piston chamber I and with a changeable effective surface in the case of a pressure impingement on the diaphragm in its piston chamber IIIa. During movement of the differential piston 34, downwardly in the drawing, the diaphragm is lifted off the conical radial ribs 5 fixed in the housing, whereby it fits increasingly against radial ribs 6 connected with the piston.

A double seat valve has been arranged in the piston part 4, the valve disc 7 together with the valve seat 8 forming the intake valve and with the upper end of the shiftable tube 9 forming the exhaust valve. By means of a shaft 10, rotatable with the axle of the vehicle via a lever connection, not shown, and a ball pin 11, the tube 9 is moved dependent on the vehicle load. The casing 11a is fixed within the lower part 1 of the housing and forms with the piston part 4, a restricted connection between the piston chambers III and IIIa.

A piston controlled shut off valve 12 has been added to foregoing brake pressure regulator, said valve constituting a connection between the piston chambers I and II. The upper piston chamber IV housing piston 13 is in constant communication with the piston chamber I via a bore 14. In the opposite direction, the piston is acted upon by a prestressed spring 15. A small sealing piston 16, connected with the piston 13, is provided at its end with a seal 17 which forms a valve disc for opening or closing the housing bore 18. The connection to piston chamber IV is established through a longitudinal bore 19 and transverse bore 19a. The brake pressure regulator is connected with the brake valve via an inlet connection 20 and with the brake cylinder via an outlet connection 21.

The mode of operation of the brake pressure regulator is as follows. In the case of the feeding of compressed air to the inlet connection 20 as well as to the piston chambers I and IV, up to the point of the applied brake pressure $P_{za}$, the shut off valve 12 remains open since the prestressed force of the spring 15 corresponds to the force of the piston 13 due to the applied pressure. Consequently, compressed air reaches the piston chamber II through the bores 19, 19a and 18. In the meantime, the differential piston 3, 4 has moved downwardly so that the outlet valve 8, 9 is closed and the inlet valve 7, 8 is opened. Compressed air of the above mentioned pressure valve is therefor conducted to the piston chambers III and IIIa. Since the diaphragm 3 is subjected on both sides to the same pressure, it does not exercise any regulating effect, so that up to this point the brake cylinder pressure increases with the brake valve pressure at a ratio of 1:1. Both pressures as shown in FIG. 2 move along the characteristic line I up to the point A.

If now the brake valve pressure becomes greater than the applied pressure $P_{za}$, then the shut off valve 12 will close the bore 18 while compressing the spring 15. In the piston chamber II, the pressure $P_{za}$ remains constant. The further regulating activity of the brake pressure regulator will now depend on the position of the tube 9 which depends on the vehicle load, and thus on the position of the output valve seat. FIG. 1 shows its position for a fully loaded vehicle. In this case the differential piston during an increasing brake valve pressure does not move downwardly through a substantial path S so that the diaphragm 3 will continue to fit against the stationary housing ribs 5. The ratio of the effective surfaces remains 1:1 and correspondingly also the ratio of the brake valve pressure to the brake cylinder pressure. This process is shown in FIG. 2 by way of the characteristic line I.

If on the other hand the tube 9 assumes a position for an empty vehicle, that is, shifted entirely downwardly, then the differential piston 3, 4 will move downwardly in the case of brake valve pressures above $P_{za}$, whereby the entire surface of the diaphragm 3 will fit against the piston ribs 6. Thus, the ratio of the effective surfaces for the vehicle, above considered as the example, has changed to 1:4 so that the brake cylinder pressure amounts to one-fourth of the brake valve pressure. In FIG. 2 this process is represented by the characteristic line III.

The unregulated front wheel brake and the regulated rear wheel brake apply the brakes at the same point in time (A) because of the invention, and the actual braking processes are started simultaneously.

While one embodiment of the invention has been shown and described herein, it will be readily understood by those skilled in the art that various modifications may be made without departing from the spirit of the invention. Reference will therefore be had to the appended claims for a definition of the limits of the invention.

What is claimed is:

1. A brake pressure regulator valve dependent on vehicle load for controlling the application of fluid pressure from an inlet to an outlet and thence to a brake cylinder comprising via a differential pressure responsive member having a changeable ratio of its effective surfaces and including a double seat valve device, said member having a constant effective surface subjected to the pressure at said inlet and a variable effective surface subjected on one side to the pressure at said outlet, a shut off valve for subjecting the opposite side of said variable effective surface to the pressure at said inlet, a piston connected with said shut off valve, a prestressed spring for normally moving said piston in a direction to open said shut off valve, and means for subjecting said piston to the pressure at said inlet whereby said piston will close the last named valve when the pressure at said inlet reaches a value predetermined by said spring.

2. A brake pressure regulator valve according to claim 1 wherein said piston is connected to a second piston of lesser diameter and said shut off valve is formed on the free end of said second piston, the latter being guided in a cylinder having an end portion forming a seat for said shut off valve.

3. A brake pressure regulator valve according to claim 2 wherein said second piston is provided with a bore for connecting said shut off valve with said inlet.

No references cited.

EUGENE G. BOTZ, *Primary Examiner.*

UNITED STATES PATENT OFFICE

CERTIFICATE OF CORRECTION

Patent No. 3,302,982                                        Febraury 7, 1967

Ewald Pekrul

It is hereby certified that error appears in the above numbered patent requiring correction and that the said Letters Patent should read as corrected below.

Column 4, line 15, for "via" read -- comprising --.

Signed and sealed this 28th day of November 1967.

(SEAL)
Attest:

Edward M. Fletcher, Jr.                                  EDWARD J. BRENNER

Attesting Officer                                            Commissioner of Patents